United States Patent [19]

Tam et al.

[11] Patent Number: 5,428,360
[45] Date of Patent: Jun. 27, 1995

[54] MEASUREMENT OF RADAR CROSS SECTION REDUCTION

[75] Inventors: Kent K. Tam, Rowland Heights; Leon Burks, Jr., Los Angeles, both of Calif.

[73] Assignee: Northrop Grumman Corporation, Los Angeles, Calif.

[21] Appl. No.: 268,371

[22] Filed: Jun. 28, 1994

[51] Int. Cl.⁶ .................................................. G01S 7/41
[52] U.S. Cl. ..................................... 342/165; 342/174; 342/1
[58] Field of Search ............... 342/165, 173, 174, 193, 342/192, 1, 4

[56] References Cited

U.S. PATENT DOCUMENTS

| | | | |
|---|---|---|---|
| 3,568,196 | 3/1971 | Bayrd et al. | 342/4 |
| 3,721,982 | 3/1973 | Wesch | 342/1 |
| 3,842,418 | 10/1974 | Lorber | 343/5 SA |
| 4,415,898 | 11/1983 | Gaunaurd et al. | 343/5 SA |
| 4,473,286 | 9/1984 | Pusch et al. | 342/5 |
| 4,879,560 | 11/1989 | McHenry | 342/165 |
| 4,901,080 | 2/1990 | McHenry | 342/1 |
| 5,084,707 | 1/1992 | ReitsGunton | 342/376 |
| 5,214,432 | 5/1993 | Kasevich et al. | 342/3 |
| 5,281,972 | 1/1994 | Jain | 342/25 |
| 5,315,306 | 5/1991 | Doughty et al. | 342/192 |
| 5,325,094 | 6/1994 | Broderick et al. | 342/1 |

*Primary Examiner*—John B. Sotomayor
*Attorney, Agent, or Firm*—Terry J. Anderson; Karl J. Hoch, Jr.

[57] ABSTRACT

A methodology for the measurement of the effectiveness of gap filler materials and treatments in radar cross section reduction uses an untreated calibration gap in a plate mounted at an acute angle so that specular reflection from radar illumination is diverted away from the horn antenna while monostatic reflection is returned to the antenna. A dielectric lens is used to focus the radar illumination in a narrow beam width so that edge effects of the plate are minimized, obviating the need for an anechoic facility. A spectral baseline is first determined using an untreated gap after which a relative quantitative test is performed on a treated gap. The antenna and horn may be mounted for motion along the gap to determine the electrical continuity of the gap treatment.

7 Claims, 1 Drawing Sheet

MEASUREMENT OF RADAR CROSS SECTION REDUCTION

BACKGROUND OF THE INVENTION

1. Field of the Invention

The present invention relates to techniques for the measurement of radar cross sections and in particular relates to the measurement of the effectiveness of gap filler materials and treatments used in radar cross section reduction (RCSR) applications.

2. Background of the Invention

Reducing the radar cross section of military planes and other military equipment has become an important task in the design, manufacturing and repair of such equipment. Conventional RCSR techniques have required the use of anechoic facilities in which the entire piece of equipment was illuminated with a planar wavefront in order to determine the radar cross section.

Such techniques are not well suited for use in measuring the small changes in radar cross section resulting from modern RCSR enhancements techniques such as the use of gap filler materials. Although the overall RCSR improvement from such enhancement techniques is substantial, it has conventionally been difficult to obtain even qualitative measurements of the effectiveness of particular techniques. What is needed is a convenient technique for measuring the RCSR effectiveness of gap filler materials both for the design and development of stealth equipment as well as for the repair and maintenance thereof.

SUMMARY OF THE INVENTION

The present invention provides a quick and convenient technique for measuring the RCSR effectiveness of gap filler materials, and other such RCSR techniques, by utilizing both a calibrated reference as well as the test target. Both the reference and the test target are metallic plates angled with respect to the incident radar illumination in order to reflect specular radiation away from the radar horn while directing monostatic radiation directly back to the horn. A dielectric lens is used to focus the incident radiation on a surface feature to be tested such as a gap in the calibrated reference and in the test target in order to obviate the need for an anechoic facility.

The radar cross section of the gap in the calibration reference is first tested. Thereafter, the test target in which the same size gap has been filled with the RCSR gap filler material, is tested under the same conditions. The difference in test results is therefore due directly to the effectiveness of the gap filler material in reducing the radar cross section of the target.

In a first aspect, the present invention provides a method for determining the effectiveness of a radar cross section reduction (RCSR) treatment of a feature of a surface by applying radar illumination during a calibration phase from an antenna to the feature without the RCSR treatment at an acute angle so that monostatic reflection is returned to the antenna while specular reflection is not to produce a spectral baseline, applying radar illumination during a testing phase from the antenna to the RCSR treatment in the feature at the acute angle, and comparing the monostatic reflection received by the antenna during the testing phase to the spectral baseline to determine the relative reduction in radar cross section achieved by the RCSR treatment.

These and other features and advantages of this invention will become further apparent from the detailed description that follows which is accompanied by drawing figures. In the figures and description, reference numerals indicate various features of the invention, like numerals referring to like features throughout both the drawing figures and the description.

DETAILED DESCRIPTION OF THE PREFERRED EMBODIMENT(S)

The present invention provides a quantitative qualification of the RCSR effectiveness of gap filler material by testing the monostatic scattering of both untreated and treated gaps. These gaps represent surface discontinuities on low observable military equipment such as airplanes designed for minimum radar cross section. If left untreated, such surface discontinuities, on a wing surface for example, would produce a noticeable radar response compared to an unbroken or continuous portion of the same wing surface.

It is known that electrically conductive material placed in such gaps will reduce the radar cross section of the gap. The degree of electrical conductivity required, and the effects of other characteristics of the treatment including the surface smoothness, have to be determined empirically. In one example, a urethane compound loaded with various amounts of conductive particles is tested to determine the percentage of conductive filler required to produce the desired RCSR. In accordance with the present invention, this empirical determination is accomplished in a two phase test in which an untreated gap is first illuminated and measured to define a baseline after which the same or a similar gap is treated with the urethane material to determine the reduction in radar cross section due to the use of the filler material. The second phase may then be iterated with different percentages of conductive particles in the urethane to determine the level of particulate filler required for the desired degree of cross section reduction.

Figure 1:
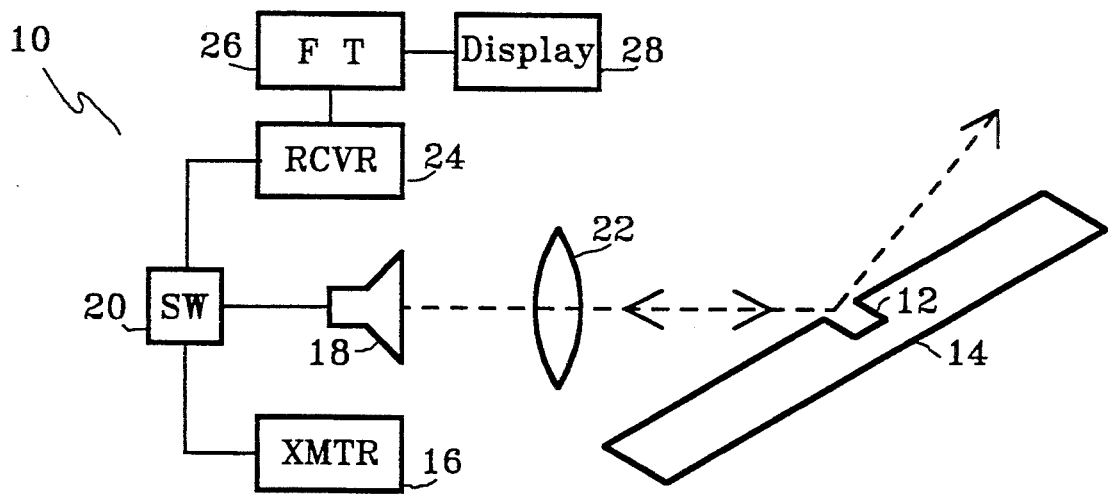
FIG. 1 is a schematic illustration of the microwave energy path from a radar horn through a dielectric lens to a calibration reference.

FIG. 1 shows an illustration of a test setup for the first phase of an RCSR effectiveness study in which the radar cross section of an untreated gap is measured. In particular, calibration setup 10 uses untreated gap 12 in test plate 14. Test plate 14 may conveniently be constructed from a 17" by 17" machined aluminum plate in which a 0.125" by 0.125" gap has been machined. Test plate 14 is mounted at an acute angle from the horizontal, such as 25°, to reduce or eliminate the effects of specular scattering from the polished surface of the machined aluminum plate 14.

A pulse of microwave energy, at the desired frequency, is produced by conventional microwave transmitter 16 and is gated to microwave horn antenna 18 by switching network 20. The pulse of microwave energy emitted by microwave horn antenna 18 is applied to dielectric lens 22 which focusses the energy on test plate 14 to apply a vertically polarized E field to untreated gap 12. Using conventional materials, dielectric lens 22 can provide an aperture, or focussed beam width of the order of 2" in diameter. The beam width of the microwave energy is therefore substantially smaller than test plate 14 so that the effects of the edges of test plate 14 are minimized.

Some of the energy striking the test fixture will produce specular reflection due to the metallic surface, and gap, of test plate 14. By mounting the test fixture at an acute angle inclined with respect to the incident radiation, specular reflection is diverted away from microwave horn antenna 18. Horn antenna 18 receives radiation by monostatic reflection from untreated gap 12 though dielectric lens 22. Switching network 20 applies the received monostatic reflection energy to receiver 24. The time gated pulse produced by untreated gap 12 may conveniently be converted to the frequency domain by Fourier transform FT 26 to provide a spectral baseline shown on amplitude vs frequency display 28.

After a spectral baseline has been established using calibration setup 10, the test is repeated using a test fixture in which the gap has been treated. Gap treatments are known which use conductive materials suspended in gap filler materials as well as using mechanical devices. For convenience, the following discussion will concentrate on the use of a gap filler material, but the invention is equally applicable to treating of other gap treatment techniques.

Figure 2:
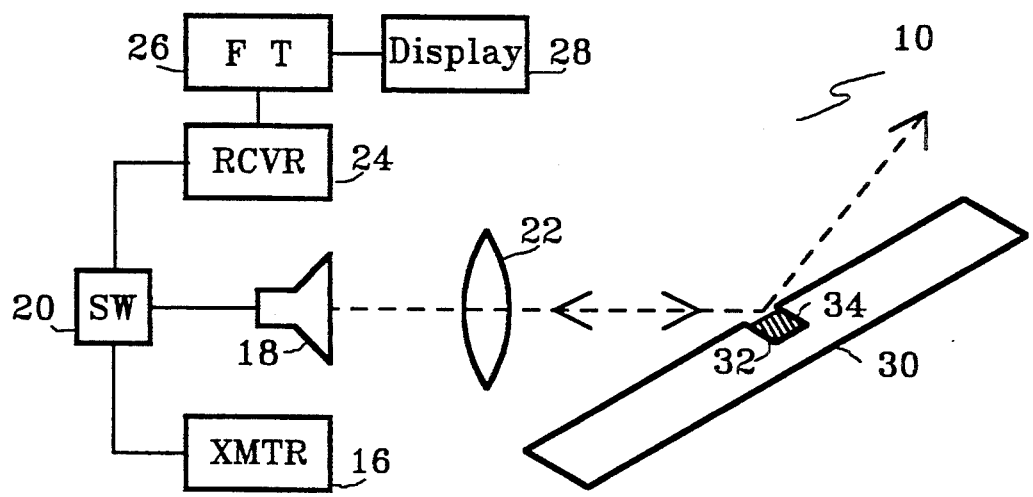
FIG. 2 is a schematic illustration of the microwave energy path shown in FIG. 1 from the radar horn through the dielectric lens to a test target in which a gap in the calibration reference has been filled with a gap filler material.

Referring now to FIG. 2, test plate 14 including untreated gap 12 has been replaced by test fixture 30 in which gap 32 has been treated by being substantially filled with gap filler material 34. Gap filler materials include, for example, a polymeric matrix mixed with different amount of conductive particles. In particular, a urethane base material loaded with conductive particles has been used with the test fixtures. A base material loaded with conductive particles from 0% to 50% in weight was tested at frequencies from 6 to 18 GHz.

As the electrical conductivity of the gap filler material is increased by increasing amounts of conductive particles, the electrical discontinuity of the gap is reduced. This reduction is measurable in accordance with the present invention.

Gap 32, treated with gap filler material 34, is illuminated by horn antenna 18 excited by microwave transmitter 16. The vertically polarized, E field radiation is focussed on gap 32 by dielectric lens 22 so that specular radiation is reflected away from horn antenna 18 while monostatic reflection is returned directly to horn antenna 18. The received radiation is processed by receiver 24, FT 26 and the results are displayed on display 28.

The quantitative RCSR effectiveness of the gap filler material may easily be determined by comparing the spectral baseline provided by the apparatus of FIG. 1 used to test untreated gap 12 and the results produced by the apparatus of FIG. 2 used to test gap 32 treated with gap filler material 34. These results are describable in terms relative to the spectral baseline, such as "application of gap filler material A in a 0.1" wide by 0.1" deep gap on an aluminum surface reduces the radar scattering by Xdb at YGHz at normal incidence", or "the normal size of the radar cross section of a 0.125" wide by 0.2" deep gap perceived by X-Band radar is X% smaller with the gap treatment", or "this material provides a uniform reduction of Xdb from Y to ZGHz in a 0.2" wide by 0.2" deep gap".

The techniques of the present invention may conveniently be used for the measurement and qualification of gap filler materials to be used and for evaluating the effectiveness of such treatments when actually used by evaluating test coupons and the like. These tests are applicable to quality control of gap filler materials for RCSR treatment, for non-destructive quality inspection of electrical smoothness, or continuity, of low observable treated surfaces and gaps at radar frequencies and for the inspection of repaired low observable structures.

Figure 3:
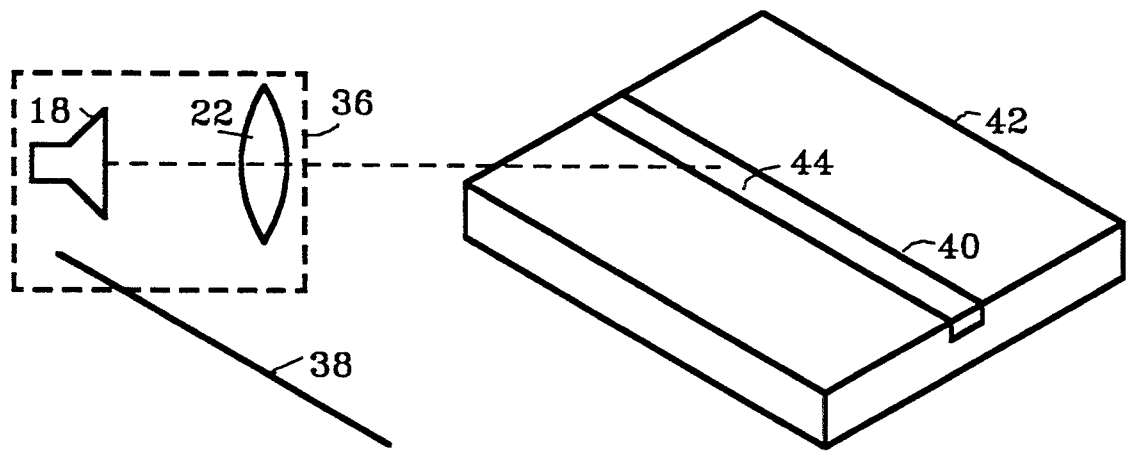
FIG. 3 is an illustration of an antenna horn and dielectric lens mounted for motion parallel to an elongate surface feature to measure the electrical continuity of a feature treatment.

Referring now to FIG. 3, microwave horn antenna 18 and dielectric lens 22 are mounted in sliding fixture 36 for quality inspection of electrical smoothness treatment. Sliding fixture 36 is mounted for motion along fixture track 38 which is parallel with gap 40 in plate 42. Gap 40 has been treated with a gap treatment, such as gap filler material 44. As fixture 36 is moved along track 38, the incident radiation from antenna 18 moves along gap treatment 42. The measurements from fixture 36 will therefore indicate the effectiveness of the various portions of the gap treatment along the gap.

This technique of moving the source of radar illumination along a surface feature of a material to be tested provides a mechanism for assuring that the surface feature, such as an RCSR treated gap, has consistent electrical qualities along its length. The ability to test surface features in this manner is useful both during original fabrication as well as after maintenance and repair of low observable equipment.

Although specific embodiment(s) of the invention have been shown, it is well within the skill of a person of ordinary skill in this art to make modifications and changes in the design without departing from the spirit and scope of the invention which is defined by the following claims.

The invention claimed is:

1. A method for determining the effectiveness of a radar cross section reduction (RCSR) treatment of a feature of a surface, comprising the steps of:
    applying radar illumination to produce a spectral baseline during a calibration phase from an antenna to the feature without the RCSR treatment at an acute angle so that monostatic reflection is returned to the antenna while specular reflection is not;
    applying radar illumination during a testing phase from the antenna to the RCSR treatment in the feature at the acute angle; and
    comparing the monostatic reflections received by the antenna during the testing phase to the spectral baseline to determine the relative reduction in radar cross section achieved by the RCSR treatment.

2. The invention of claim 1 wherein the feature is a gap in the surface.

3. The invention of claim 1, wherein the acute angle is on the order of about 25°.

4. The invention of claim 1, further comprising the step of:
    focussing the radar illumination on the feature with a dielectric lens to have a narrow beam width.

5. The invention of claim 4, further comprising the step of:
    focussing the monostatic reflection on the antenna with the dielectric lens.

6. The invention of claim 4, further comprising:

selecting the size of the surface with respect to the beam width so that effects of irregularities and surface edges not related to the feature are minimized in the monostatic reflection.

7. The invention of claim 4 wherein the feature is elongate and the invention further comprises the steps of:
   mounting the antenna and dielectric lens for motion in a direction parallel with the elongation of the feature; and
   moving the antenna and lens along the direction during the testing phase to determine the electrical continuity of RCSR treatment.

* * * * *